United States Patent
Khafagy et al.

(10) Patent No.: US 10,173,666 B2
(45) Date of Patent: Jan. 8, 2019

(54) ENGINE STOP AND START DEBOUNCE TIMER FOR VEHICLES

(71) Applicant: Ford Global Technologies, LLC, Dearborn, MI (US)

(72) Inventors: Hafiz Shafeek Khafagy, Dearborn, MI (US); Jonathan Wentworth, Chelmsford Essex (GB); Essam Mohamed, Dearborn, MI (US); Rashad Jamal Allen, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 15/251,173

(22) Filed: Aug. 30, 2016

(65) Prior Publication Data

US 2018/0056979 A1  Mar. 1, 2018

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/40* | (2016.01) |
| *G05B 13/02* | (2006.01) |

(52) U.S. Cl.
CPC ......... *B60W 20/40* (2013.01); *G05B 13/0265* (2013.01)

(58) Field of Classification Search
CPC ........................... B60W 20/40; G05B 13/0265
USPC .......................................................... 701/22
See application file for complete search history.

(56) References Cited

U.S. PATENT DOCUMENTS

| | | | | |
|---|---|---|---|---|
| 8,712,673 | B2* | 4/2014 | Gwon | F02N 11/0818 |
| | | | | 123/179.4 |
| 2014/0005866 | A1* | 1/2014 | Kuang | B60W 10/06 |
| | | | | 701/22 |
| 2015/0158480 | A1* | 6/2015 | Rademacher | B60W 10/06 |
| | | | | 477/92 |
| 2018/0058353 | A1* | 3/2018 | Khafagy | F02D 41/042 |

FOREIGN PATENT DOCUMENTS

DE 102014010307 A1  12/2015

* cited by examiner

*Primary Examiner* — Harry Y Oh
(74) *Attorney, Agent, or Firm* — Brooks Kushman P.C.

(57) ABSTRACT

A vehicle includes an engine and a controller. The controller starts the engine in response to a brake status before and during a change in vehicle operating mode achieving predetermined states, and expiration of a timer initiated upon completion of the change and having a duration based upon a learned mean mode-specific shift time window. The change is initiated in response to a request to change vehicle operating mode while the engine is off.

5 Claims, 5 Drawing Sheets

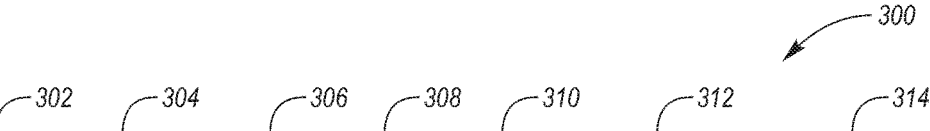

| Original Mode | Engine Status Before Change | Brake Status Before Change | Current Mode | New Brake Status | Engine Status Before Timer Has Expired | Engine Status After Timer Has Expired |
|---|---|---|---|---|---|---|
| Sport | Auto Stopped | Applied | Park | Applied | Remain Stop | Remain Stop |
| Sport | Auto Stopped | Applied | Park | Released | Remain Stop | Remain Stop |
| Sport | Auto Stopped | Applied | Reverse | Applied | Remain Stop | Auto Start |
| Sport | Auto Stopped | Applied | Reverse | Released | Auto Start | Remain Running |
| Sport | Auto Stopped | Applied | Neutral | Applied | Remain Stop | Remain Stop |
| Sport | Auto Stopped | Applied | Neutral | Released | Remain Stop | Remain Stop |
| Sport | Auto Stopped | Applied | Drive | Applied | Remain Stop | Remain Stop |
| Sport | Auto Stopped | Applied | Drive | Released | Auto Start | Remain Running |
| Sport | Auto Stopped | Applied | Sport | Applied | Remain Stop | Remain Stop |
| Sport | Auto Stopped | Applied | Sport | Released | Auto Start | Remain Running |
| Sport | Running | Applied | Park | Applied | Remain Running | Auto Stop |
| Sport | Running | Applied | Park | Released | Remain Running | Auto Stop |
| Sport | Running | Applied | Reverse | Applied | Remain Running | Remain Running |
| Sport | Running | Applied | Reverse | Released | Remain Running | Remain Running |
| Sport | Running | Applied | Neutral | Applied | Remain Running | Auto Stop |
| Sport | Running | Applied | Neutral | Released | Remain Running | Auto Stop |
| Sport | Running | Applied | Drive | Applied | Remain Running | Auto Stop |
| Sport | Running | Applied | Drive | Released | Remain Running | Remain Running |
| Sport | Running | Applied | Sport | Applied | Remain Running | Auto Stop |
| Sport | Running | Applied | Sport | Released | Remain Running | Remain Running |
| Sport | Running | Released | Park | Applied | Remain Running | Auto Stop |
| Sport | Running | Released | Park | Released | Remain Running | Auto Stop |
| Sport | Running | Released | Reverse | Applied | Remain Running | Remain Running |
| Sport | Running | Released | Reverse | Released | Remain Running | Remain Running |
| Sport | Running | Released | Neutral | Applied | Remain Running | Auto Stop |
| Sport | Running | Released | Neutral | Released | Remain Running | Auto Stop |
| Sport | Running | Released | Drive | Applied | Remain Running | Auto Stop |
| Sport | Running | Released | Drive | Released | Remain Running | Remain Running |
| Sport | Running | Released | Sport | Applied | Remain Running | Auto Stop |
| Sport | Running | Released | Sport | Released | Remain Running | Remain Running |

| Entry | Shifter Status | Shift Start | Shift End | Shift Length | Retain Value for Statistical Analysis (eg., < 3 Sec.) | Transition or Mode Change? |
|---|---|---|---|---|---|---|
| 1 | S | 13:01:05.2 | 13:20:06.4 | 0:19:00.0 | Discard | Mode Change |
| 2 | D | 13:20:06.5 | 13:20:06.7 | 0:00:00.2 | Retain | Transition |
| 3 | N | 13:20:06.7 | 13:20:06.8 | 0:00:00.2 | Retain | Transition |
| 4 | R | 13:20:06.8 | 13:20:06.9 | 0:00:00.1 | Retain | Transition |
| 5 | P | 13:20:07.0 | 13:40:15.0 | 0:20:08.0 | Discard | Mode Change |
| 6 | R | 13:40:15.1 | 13:40:15.2 | 0:00:00.1 | Retain | Transition |
| 7 | N | 13:40:15.2 | 13:40:15.3 | 0:00:00.1 | Retain | Transition |
| 8 | D | 13:40:15.3 | 13:40:15.3 | 0:10:00.0 | Discard | Mode Change |

FIG. 4

ENGINE STOP AND START DEBOUNCE TIMER FOR VEHICLES

TECHNICAL FIELD

The present disclosure relates to debounce timers for vehicles that may have a sport mode.

BACKGROUND

Shift by wire vehicles may include a lever arm to control transitions between vehicle modes. These vehicle modes may include drive, reverse, park, neutral, and sport. The mode may determine a direction of travel for the vehicle or performance characteristics.

In hybrid vehicles, the control system of the vehicle may choose to start or stop a combustion engine based on a variety of factors. These factors may include the selected mode. In many shift by wire vehicles, the lever arm may pass through various modes during the transition between the original mode selection and the final mode selection. For example, a vehicle occupant may actuate the shifter to transition from park to drive and momentarily select reverse and neutral. The transitory selection of these modes may impede the proper application of control logic for the engine stops and starts.

SUMMARY

A vehicle may include a controller programmed to start an engine based on a brake status before and during a mode change, and expiration of a timer initiated upon completion of the mode change and having a duration based on a learned mean mode-specific shift time window. The engine may be started in response to a request to change modes. A mean mode-specific transition period may be based on aggregated user data. A pre-change mode may be a Sport mode. A post-change mode may be a reverse driving mode.

BRIEF DESCRIPTION OF THE DRAWINGS

FIG. 3 is a lookup table of a control system for determining the proper start and stop behavior under particular circumstances;

FIG. 4 is a data aggregation table that contains data for calculations of a mean transition time and timer;

DETAILED DESCRIPTION

Figure 1:
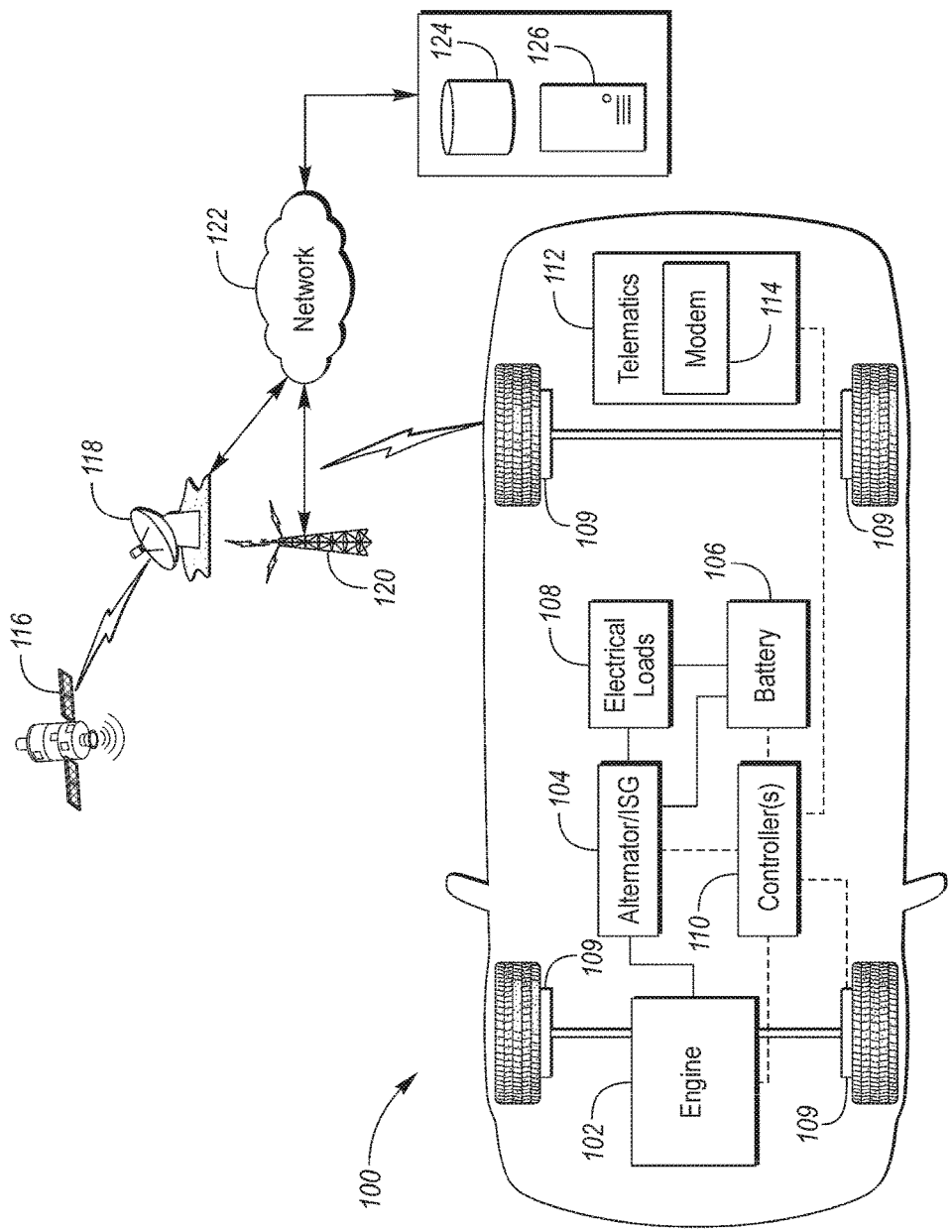
FIG. 1 is a schematic diagram of a vehicle having a start and stop controller and off board network communications.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid electric vehicles reduce emissions by minimizing the use of fossil fuels. Other vehicles may reduce fossil fuel consumption. For example, mild-hybrid and micro-hybrid vehicles may sporadically start and stop the engine to reduce fuel consumption and improve emissions. Control schemes are implemented to start and stop these engines based on various factors. For example, an engine may be started to charge a battery or provide additional motive power. If the vehicle is placed in park while the engine is running, the control scheme may instruct the controller to stop the engine. As another example, a control scheme may instruct the controller to stop the engine when the vehicle is in a neutral mode. Under certain conditions, the control scheme may instruct the controller to start the engine or maintain the engine in a running state in the reverse gear or drive gear. A vehicle occupant may move the lever from reverse to drive. The typical P-R-N-D configuration may cause the controller of particular hybrid vehicles to toggle the engine state as the lever passes through the neutral mode, as discussed above.

A debouncing delay timer may be implemented to prevent unwanted engine start and stop cycles when the mode-shift lever is transitioning between original and desired modes. The debouncing delay timer may be set for a specific, static time window. A static time window may cause unintended consequences. For example, certain vehicles may have longer transition distances. Meaning, the distance between each driving mode may be inconstant. Inconstant distances may give rise to varying transition times between particular driving modes. Variable transition times may hinder the effectiveness of the static time window. For example, Vehicle A may have a larger interior and mode shifter than Vehicle B. The larger shifter may have a longer transition time from drive to park. If both vehicles have the same static time window, the smaller vehicle may have too long of a static time window, or the time window may be ineffective for the larger time window. In a similar vein, vehicles having identical mode shifters may require dynamic time windows. For example, Vehicle A may be driven by predominantly slow shifters, and Vehicle B may be driven by predominantly fast shifters. A dynamic time window may be tuned to ensure proper start and stop behavior from the control system.

In general, vehicles have mode shifters with four modes as discussed above. The addition of a fifth mode creates an additional layer of complexity to debouncing delays and control system behavior. A drive mode and sport mode may be collectively considered a forward drive mode. A start and stop control system with a sport mode option may change the start and stop triggers. For example, an engine may be left running in a sport mode to increase performance. An engine may be stopped in a normal mode under similar circumstances to conserve fuel consumption. The change in start and stop triggers may also impact the debouncing delay timer. A static window may be inadequate in providing the proper control system inhibition when the two use modes are available.

A dynamic time window may be determined based on aggregated data from users. A vehicle information system may be implemented to send data off board to a cloud server. The cloud server may receive mode shifter use data and store it in a database. The data may include information related to the time history of each mode change. As the shifter is placed in each particular mode, a time stamp may be recorded with the change. The server may aggregate all of the shifts from a given direction. For example, the server may find the average transition time from drive to neutral and neutral to drive. The information system may create a mode-shift transition time series to retain and determine the intended target mode. For example, the system may recognize that when transitioning from park to drive the shifter traverses through reverse and neutral as well. As the average shift time windows are calculated for the particular vehicle model or shifter configuration, the start and stop control scheme may be updated with new debounce timings to ensure unnecessary toggling does not occur.

The start and stop control scheme may take brake status, before, during, and after the shift, into account. The brake status may be indicative of the energy requested to operate the vehicle. For example, a brake applied before the shift and released after or during the shift may indicate intent to use increased energy after the shift. Under these circumstances, the controller may start the engine to anticipate the increased consumption of energy. The controller may also anticipate a reduction in energy consumption. While shifting to certain gears, application of the brake after the shift may indicate intent to reduce energy consumption. The controller may anticipate the reduction by stopping the engine. Anticipation by the controller may take into consideration the status of the time window. For example, the controller may base the start and stop of the engine on the pre and post brake status, the mode shift, and the expiration of the time window.

Now referring to FIG. 1, a vehicle 100 having a connection to a network 122 is shown. The vehicle 100 may have an engine 102 with a mechanical linkage to an alternator or integrated starter generator (ISG) 104. The ISG 104 may have electrical connections to electrical loads 108 and a battery 106. The engine 102, ISG 104, and battery 106 may be connected to common or separate controller(s) 110. The controller 110 may be connected to a braking system 109. The braking system may include friction brakes, regenerative brakes, or a combination thereof. The controller may be in communication with a telematics unit 112 having a modem 114 for communicating with an off board network 122. The network 122 may include a satellite 116 and receiving station 118. The network 115 may also include transceiver towers 120. The satellite 116 and towers 120 may receive signals from the vehicle for data aggregation and calculation. The network may include a database storage system 124 and a server 126 for calculating vehicle data.

Figure 2:
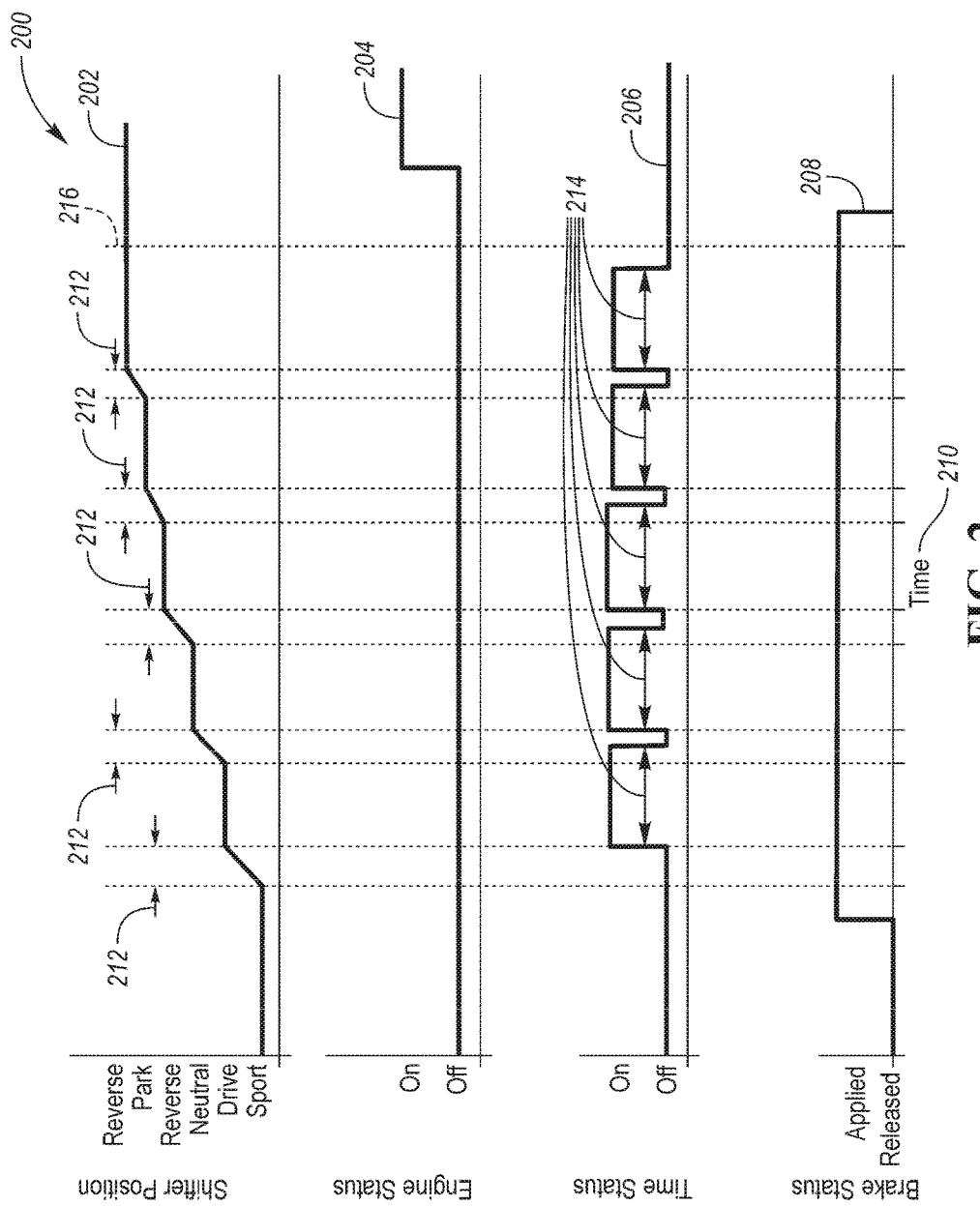
FIG. 2 is a composite graph showing control system behavior during a mode change.

Now referring to FIG. 2, a composite graph 200 is shown. The composite graph 200 is shown over time 210. The composite graph 200 has a shifter position curve 202, an engine status curve 204, a timer status curve 206, and a brake status curve 208. Curve 202 describes a shifter transitioning between a sport mode and a park mode while traversing drive, neutral, and reverse. As the shifter is moved, a transition period 212 may be used to indicate a period where the shifter is between modes. The control system and shift design may determine the length of the transition period 212. The shifter position may be unknown during the transition period 212. The shift position may be associated with a particular mode until a new mode is selected to prevent unknown transition periods 212. Small changes to the algorithm may be required to ensure the shifter position is identified at all times. The shift or mode position curve 202 shows a shifter transitioning from sport to reverse. The shifter position transitions to park and then back to reverse, indicating the operator unintentionally moved the mode selector to park. The Curve 204 depicts engine status based on a control algorithm designed to start or stop the engine. Curve 206 depicts a transition period 212. The timer, time window, or debouncing delay timer 214 is started at each shift. The timer 214 may start when the shifter is moved from the original mode or shifted into the new mode, depending on the shifter position determination described above. Each timer 214 may have a different length depending on the originating or destination mode. As shown, the timer 214 may lapse before the next shift begins, indicating that the current mode is the destination mode. Each of the transitions from sport to park mode occur before the timer 214 expires. At 216 the controller is required to apply start and stop logic because the timer has expired without a mode change. FIG. 2 shows the proper application of the debouncing delay timer in combination with brake application and vehicle start and stop logic. The timer 214 may be different for each transition period depending on the originating mode and destination mode. The control logic may apply start and stop functionality based on the final mode reached with expiration of the specific timer 214. As shown at time 216, the timer has expired and the start and stop logic is enabled by the controller. The control logic may take into account the brake status curve 208 to determine the proper start and stop behavior. As shown in FIG. 2, the brake, as indicated by the brake curve 208, is applied throughout the shifter mode transition. The timer 214 may be based on two standard deviations of a statistical mean time window. The timer 214 may be dependent on the particular shift being performed. For example, a shift from sport to drive may have a particular timer 214 length or time window. A shift from drive to neutral may have an entirely different timer 214 length.

Now referring to FIG. 3, a lookup table 300 is shown. The lookup table 300 has proper control system behavior listed for each original gear or mode 302. Although sport mode is depicted, the original gear or mode 302 may be any mode. The lookup table 300 has an engine status before change column 304. The lookup table 300 has a brake status before change column 306. The brake status before change 306 may be determined when the current mode 308 is entered, when the shifter leaves the original mode 302, or at a time there between. The brake status before change column 306 indicates another logical path based on the brake status before the shift. The lookup table 300 has proper control system behavior listed for each current gear or mode 308. The current mode 308 may be determined based on a variety of factors, including estimation. The lookup table 300 includes a new brake status 310. The new brake status 310 may be during the mode change. The new brake status 310 may be determined at the time the current mode 308 is entered. The new brake status 310 may be determined when the timer has been initiated. The new brake status 310 may be determined at an assigned time during the timer period. The new brake status 310 may also be determined during a transition period between modes. As mentioned above, controller realization of a shift from an original mode to a current mode may vary based on a variety of factors, including whether the shifter status is determined based on an entry into a mode or exit from a mode. The determination of the brake status may similarly vary based on a variety of factors, including the mode-status determination and shifter-specific factors. Therefore, the lookup table may include instructions for control system behavior depending on the status of the timer 214. The control system may start, stop, or maintain the engine status based on the aforementioned columns and indicators based on the scheme disclosed in columns 312, 314.

Now referring to FIG. 4, a table 400 of a database may include entries 402 containing historical information of shifter status 404 for each vehicle, driver, or shifter type. The table or database may include more information based on different identifiers. The shift or mode start 406 column indicates an entry into the table 400 for the initial shifter status. The shift or mode end 408 column indicates an entry into the table 400 for the time when the shifter leaves the current shift status 404. Shift or mode length 410 indicates the amount of time the shifter was at a particular status 404. A calculation may be performed on the shift or mode length 410 value to determine the average time a shifter spends at each mode in transit to another mode. For example, as shown, the shifter begins at entry 1 in a sport mode. The first shifter destination is park at entry 4. In order to compute the average time for the timer 214, the controller may discard timer values above a particular threshold. The computation algorithm may discard outliers or long timer values because long periods at particular modes should not be calculated in the mode transition calculation to determine the transitory period at each mode. For example, the system may discard values over 50 seconds. The system is able to identify the type of transition in column 414, and indicate to the start and stop system whether to inhibit or allow start and stop or which start and stop algorithm to use.

Figure 5:
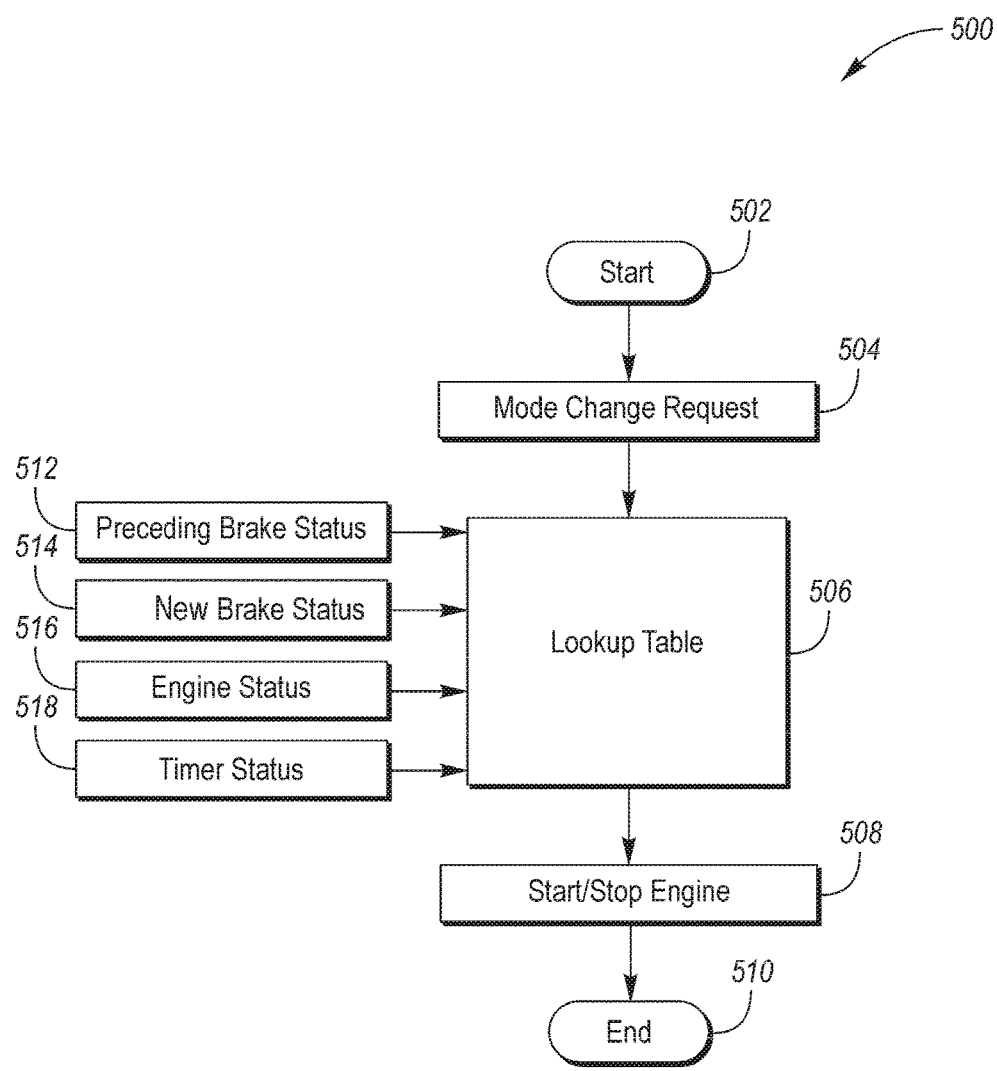
FIG. 5 is a flow diagram for control system logic.

Now referring to FIG. 5, a flow diagram 500 is depicted. The flow diagram 500 has a start at step 502. In step 504, the system receives a mode change request as the shifter position is adjusted. In step 506, a lookup table is used to determine the proper start and stop behavior based on inputs statuses 512, 514, 516, and 518. One input is the preceding brake status 512. Another input is the transitional brake status 514. Another input is the engine status 516. Another input is the timer status 518. Any other inputs may be used to determine proper start and stop behavior. In step 508, the control system may properly start and stop the engine. In step 510, the method ends or repeats, depending on the application.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine; and
   a controller programmed to start the engine responsive to shifting, while the engine is off and brakes remain applied, from sport to reverse and expiration of a timer initiated upon completion of the change and having a duration that is based on previous transition times of shifts from sport to reverse.

2. The vehicle of claim 1, wherein the updated duration is based on aggregated user data.

3. The vehicle of claim 2, wherein the updated duration is specific to the vehicle.

4. The vehicle of claim 3, wherein the updated duration is specific to a driver of the vehicle.

5. The vehicle of claim 2, wherein the updated duration is only based on data having values less than a threshold.

\* \* \* \* \*